(12) United States Patent
Suzuki et al.

(10) Patent No.: US 7,534,999 B2
(45) Date of Patent: May 19, 2009

(54) QUANTUM BEAM AIDED ATOMIC FORCE MICROSCOPY AND QUANTUM BEAM AIDED ATOMIC FORCE MICROSCOPE

(75) Inventors: Shushi Suzuki, Sapporo (JP); Wang-Jae Chun, Sapporo (JP); Kiyotaka Asakura, Sapporo (JP); Masaharu Nomura, Sapporo (JP)

(73) Assignee: Japan Science and Technology Agency, Saitama (JP)

( * ) Notice: Subject to any disclaimer, the term of this patent is extended or adjusted under 35 U.S.C. 154(b) by 374 days.

(21) Appl. No.: 11/587,031

(22) PCT Filed: Dec. 21, 2004

(86) PCT No.: PCT/JP2004/019092

§ 371 (c)(1),
(2), (4) Date: Oct. 20, 2006

(87) PCT Pub. No.: WO2005/103647

PCT Pub. Date: Nov. 3, 2005

(65) Prior Publication Data

US 2007/0215804 A1    Sep. 20, 2007

(30) Foreign Application Priority Data

Apr. 21, 2004    (JP) .............................. 2004-126099

(51) Int. Cl.
*G12B 21/24*    (2006.01)
*G01B 11/30*    (2006.01)
(52) U.S. Cl. ........................................ 250/306; 73/105
(58) Field of Classification Search ................ 250/306, 250/309; 73/105
See application file for complete search history.

(56) References Cited

U.S. PATENT DOCUMENTS

| | | | | | |
|---|---|---|---|---|---|
| 5,270,214 | A | * | 12/1993 | Sessler et al. | 436/94 |
| 5,464,977 | A | * | 11/1995 | Nakagiri et al. | 250/234 |
| 5,753,814 | A | * | 5/1998 | Han et al. | 73/105 |
| 5,874,668 | A | * | 2/1999 | Xu et al. | 73/105 |
| RE37,299 | E | * | 7/2001 | Amer et al. | 73/105 |
| 6,330,824 | B1 | * | 12/2001 | Erie et al. | 73/105 |
| 6,469,288 | B1 | * | 10/2002 | Sasaki et al. | 250/201.3 |

(Continued)

FOREIGN PATENT DOCUMENTS

JP    2-69643    3/1990

(Continued)

*Primary Examiner*—Nikita Wells
*Assistant Examiner*—Johnnie L Smith, II
(74) *Attorney, Agent, or Firm*—William L. Androlia; H. Henry Koda

(57) ABSTRACT

A quantum beam aided atomic force microscopy and quantum beam aided atomic force microscope that can simultaneously perform atomic-level configuration observation and elemental analysis with the use of an atomic force microscope and further can effect analysis of the chemical state of sample surface and that as being operable in liquids, can realize the elemental analysis and chemical state analysis of biosamples with an atomic-level resolving power. Accordingly, atoms of sample surface are irradiated with quantum beams, such as charged particles, electrons and photons, having a given electron transition energy characteristic of element, and any change in interaction force between the atoms of sample surface having been irradiated with quantum beams and the distal end of the probe is detected.

8 Claims, 3 Drawing Sheets

U.S. PATENT DOCUMENTS

| | | | |
|---|---|---|---|
| 7,095,822 B1 * | 8/2006 | Yun | 378/143 |
| 7,230,719 B2 * | 6/2007 | Ng et al. | 356/501 |
| 2001/0000279 A1 * | 4/2001 | Daniels et al. | 73/105 |
| 2003/0200798 A1 * | 10/2003 | Lindig et al. | 73/105 |
| 2005/0223785 A1 * | 10/2005 | Watanabe et al. | 73/105 |
| 2006/0043286 A1 * | 3/2006 | Massie | 250/306 |
| 2007/0113630 A1 * | 5/2007 | Matsumoto et al. | 73/105 |
| 2008/0000291 A1 * | 1/2008 | Masser | 73/105 |

FOREIGN PATENT DOCUMENTS

| | | |
|---|---|---|
| JP | 3-1408426 | 6/1991 |
| JP | 5-79833 | 3/1993 |
| JP | 6-148400 | 5/1994 |
| JP | 2000-28511 | 1/2000 |
| JP | 2004-233166 | 8/2004 |

* cited by examiner

Detection signal

Detection signal

Detection signal

QUANTUM BEAM AIDED ATOMIC FORCE MICROSCOPY AND QUANTUM BEAM AIDED ATOMIC FORCE MICROSCOPE

TECHNICAL FIELD

The present invention generally relates to an atomic force microscopy and atomic force microscope, particularly to a quantum beam aided atomic force microscopy and quantum beam aided atomic force microscope that is suitable for atomic-level configuration observation of sample surface with simultaneous analysis of element and chemical state analysis of surface atoms.

BACKGROUND ART

In order to understand physical and chemical processes on material surfaces, such as catalysts, semiconductors, sensors and electronic devices, and develop highly functional materials, atomic-level elemental analysis and chemical state analysis of the surface of such materials are required. The invention of scanning tunneling microscope (STM) in 1982 achieved the observation of the conductive material surfaces and another invention of non-contact atomic force microscope (NC-AFM) in 1995 accomplished the observation of the insulating material surfaces at the atomic level. In addition to surface structure observation, the atomic force microscope is widely used for identifying various physical properties of materials, such as magnetic, electrical and mechanical properties, and functions like the extent of mechanical contact force and surface force for a minute.

However, microscope images obtained by the above conventional microscopes essentially involve no direct elemental or chemical state information on an observed material surface.

Meanwhile, to obtain atomic-level elemental or chemical state information of a solid surface, the following conventionally-known approaches are mainly suggested: (1) optical illumination scanning tunneling microscopy combined with visible light, (2) inelastic electron tunneling spectroscopy based on inelastic effect in tunneling process and (3) radiation-light exciting scanning tunneling microscopy combined with radiant X-ray.

Nevertheless, in the approaches of (1) and (3), practical use is not achieved despite their continued development, while the approach of (2) is characterized by the measurement of molecules attached to the solid surface, rather than the analysis of the solid surface itself.

On the other hand, a conventional non-contact atomic force microscope, as disclosed in Japanese Unexamined Patent Publication No. 2000-028511, comprises a cantilever secured to an oscillating means, a displacement detector for detecting the displacement of the cantilever, an amplifier for controlling said oscillating means, a frequency detector for detecting the output frequency of said displacement detector, a sample driving means for changing the distance between the sample and the distal end of the cantilever so as to keep the frequency detected constant and a control apparatus for each driving oscillating means with distinct oscillating voltages caused by controlling said amplifier. The control apparatus detects the change in oscillating frequency corresponding to the change in distance between the sample and the distal end of the cantilever at each oscillating voltage from the output of said frequency detector, and determines the oscillation amplitude of the cantilever from the difference between sudden rising positions of said oscillating frequency at each oscillating voltage.

Patent Document 1: Japanese Unexamined Patent Publication No. 2000-28511

DISCLOSURE OF THE INVENTION

Problems to be Solved by the Invention

Despite the above-mentioned technological advantages, the invention disclosed in the Japanese Unexamined Patent Publication No. 2000-028511 is unable to achieve atomic-level elemental analysis or chemical state analysis of the surface of a material.

To solve the aforementioned problems, it is, therefore, one object of the present invention to provide a quantum beam aided atomic force microscopy and quantum beam aided atomic force microscope that can simultaneously perform atomic-level configuration observation, elemental and chemical state analysis of the material surface with the use of an atomic force microscope.

Means for Solving the Problem

The quantum beam aided atomic force microscopy according to the present invention is characterized by irradiating atoms of a sample surface with quantum beams such as photons, electrons and charged particles, having a given electron transition energy characteristic of element, to detect the change in interaction force between each of the atoms irradiated with the quantum beams and a distal end of a probe.

Here, the quantum beams are the collective term for physical entities that bear quantum properties in behavior having radiant energy or translational energy of 1 eV or over, e.g., photons like X-ray and laser, electrons and charged particles.

Also, the quantum beam aided atomic force microscopy according to the present invention is characterized by irradiating atoms of a sample surface with given quantum beams such as photons, electrons and charged particles to detect the change in interaction force between each of the atoms irradiated with the quantum beams and a distal end of a probe by sequentially changing the energy of the quantum beams irradiated.

The quantum beam aided atomic force microscopy according to the present invention is characterized by obtaining atomic force microscope images without irradiating a sample surface with quantum beams, and obtaining atomic force microscope images by irradiating the same sample surface with quantum beams such as photons, electrons and charged particles by fixing a given electron transition energy characteristic of element thereof.

Furthermore in this invention, quantum beams, with which atoms of the sample surface are irradiated, are preferably X-ray having core electron transition energy to be excited to the outermost shell characteristic of element to be detected.

In addition, the quantum beam aided atomic force microscope according to the present invention is characterized by an atomic force microscope comprising a cantilever having a sharp probe that interacts with atoms of the sample surface, a displacement sensor for detecting the deflection of the cantilever, a two-dimensional scanning means for relatively scanning said probe over said sample surface two-dimensionally in a horizontal direction thereof and a vertical moving means for relatively controlling the distance between said probe and said sample surface in a vertical direction, and quantum beams irradiating means for irradiating atoms of said sample surface with quantum beams such as photons, electrons and charged particles having a given electron transition energy characteristic of element, to detect the change in interaction force between an atom of the sample surface irradiated by said quantum beams irradiating means and the distal end of the probe by said displacement sensor.

Moreover in this invention, said displacement sensor may detect the change in interaction force between the atom of the sample surface and the distal end of the probe by sequentially changing the energy of quantum beams with which the atom of the sample surface is irradiated by said quantum beams irradiating means.

In this invention, atomic force microscope images may be outputted by relatively scanning said probe over said sample surface by said two-dimensional scanning means without irradiating said sample surface with quantum beams and may be outputted by irradiating the same sample surface with quantum beams such as photons, electrons and charged particles by fixing a given electron transition energy characteristic of element thereof.

In this invention, quantum beams, with which atoms of the sample surface are irradiated, are preferably X-ray having core electron transition energy to be excited to the outermost shell characteristic of element to be detected.

Advantageous Effect of the Invention

According to the present invention, atomic-level configuration observation and elemental analysis can be simultaneously performed using an atomic force microscope, and chemical state of sample surface can also be analyzed. Since the present invention is operable in liquids, it can achieve elemental analysis and chemical state analysis for biosamples at the atomic level.

BEST MODE FOR CARRYING OUT THE INVENTION

[Basic Principle of the Present Invention]

First of all, the basic principle of the present invention will be described with reference to FIG. 1. FIG. 1 is a principle diagram for non-contact atomic force microscope (a.k.a. Near-contact Atomic Force Microscope or Dynamic Force Microscope). The non-contact atomic force microscope detects interaction force between the distal end of a probe and a sample surface and converts the data into images. Conventional theoretical calculation and work on quantum mechanics found that the interaction force between the probe and the sample surface is dispersion force or electrostatic force as a long-range force, Van der Waals forces as a short-range force and chemical interaction force like covalent bonding. The chemical interaction force is generated by the interaction between the distal end of the probe and two electron orbitals of an atom of the sample surface, Highest Occupied Molecular Orbital (HOMO) and Lowest Unoccupied Molecular Orbital (LUMO).

Accordingly, if an electron density of an electron orbital found in chemical bonding between the distal end of the probe and the atom of the sample surface can be externally controlled based on element or chemical state, interaction force therebetween can be artificially changed in accordance with the element or chemical state, thereby providing elemental and chemical analysis capabilities for an atomic force microscope. To achieve this external control, the irradiation of atoms of the sample surface with quantum beams, having a given electron transition energy characteristic of element, is a major approach.

[Demonstration Experiment of the Basic Principle of the Present Invention]

In this invention, the basic principle is demonstrated in an experiment using a sample comprising a silicon (Si) substrate partially coated with a gold (Au) thin film. At the Photon Factory of the Institute of Materials Structure Science of High Energy Accelerator Research Organization, an X-ray irradiation experiment was conducted, using a non-contact atomic force microscope installed in a beam line. The equipment includes optical axis control mechanism (not shown) which can externally adjust the quantum beam direction by remote control from a hatch on the beam line for shielding X-ray.

The sample used is Si (111) substrate coated with Au island vacuum-deposited on a part thereof. FIG. 2 shows a non-contact atomic force microscope image on this sample. The FIG. 2 demonstrates Au region in a hilly shape in its right half, with a film thickness of about 20 nm. To observe the non-contact atomic force microscope image, a self-detection type cantilever was employed as a probe. The probe was vibrated at a frequency of 88 kHz, and the frequency shift was set at −20 Hz. After the non-contact atomic force microscope image was observed, the probe was placed on the Au region. Because the change in atomic force is affected by the distance variation between the distal end of the probe and the sample surface, the distance between the distal end of the probe and the sample surface was set at a constant level once the probe position was fixed in this experiment.

To transit core electrons in Au L-shell electron orbital to peripheral electron orbital, the sample was irradiated with X-ray having energy in the vicinity of Au $L_3$ absorption edge, and the energy was swept in the measurement of atomic force. For comparison, the measurement of atomic force was carried out, by irradiating Si region with X-ray having energy in the vicinity of Au $L_3$ absorption edge while sweeping X-ray. FIG. 3 shows the results in the measurement.

FIG. 3 shows the energy by X-ray irradiation on the horizontal axis, the interaction force on the left vertical axis, and X-ray absorbance of Au on the right vertical axis measured with the use of Au foil. As shown in the FIG. 3, the Si region showed no change in atomic force found between the atom of the sample surface and the distal end of the probe, after the region was irradiated with X-ray having energy in the vicinity of Au $L_3$ absorption edge. However, a peak value observed in the Au region exhibited the change in interaction force (indicated by arrows in FIG. 3). In other words, the change in interaction force that is caused by the absorption of X-ray by Au was successfully detected. Consequently, the type of atom directly beneath the distal end of the probe, Au or Si, can be identified by finding the change in interaction force by the X-ray irradiation.

Referring to Au's X-ray absorbance, the peak interaction force in the Au region can be found near the Au absorption edge. Therefore, the change in the above interaction force is one of the attribution factors to the change in covalent bonding between the atom of the sample surface and the distal end of the probe due to the excitation of L-shell core electrons to transit to the peripheral electron orbital. Based on the principle demonstrated by the above experiment, direct elemental and chemical state analysis of the sample surface can be performed by providing a given transition energy that excites core electrons for the sample surface and analyzing the change in interaction force between the atom of the sample surface and the distal end of the probe.

EMBODIMENT OF THE PRESENT INVENTION

A preferred embodiment of the quantum beam aided atomic force microscopy and quantum beam aided atomic force microscope according to the present invention will be described with reference to the accompanying drawings based on the results of the above demonstration experiment.

FIG. 4 is a pattern diagram of this embodiment illustrating a quantum beam aided atomic force microscope 1. The quantum beam aided atomic force microscope 1 of this embodiment essentially comprises an x-y stage 2 as a two-dimensional scanning means by which a sample t can be movably placed on a horizontal plane in X and Y axial directions, a cantilever 3 which is vertically vibrating over said x-y stage 2, having a probe 3a on an end thereof, a z stage 4 as a vertical moving means for fixing and moving said cantilever 3 in a vertical z direction, a laser beam irradiator 5 for providing laser beam via a reflecting mirror 5a to back side of said cantilever 3, a position sensitive detector 6 for detecting a deflection position of reflected light caused by the deflection in bending of said cantilever 3, a quantum beams irradiating means 7 for irradiating the surface of said sample t with quantum beams such as photons like X-ray and laser, electrons and charged particles, and a control apparatus 8 for controlling the energy of quantum beams emitted from said quantum beams irradiating means 7, for controlling said z stage 4 based on a position signal outputted from said position sensitive detector 6 and for outputting images by adjusting the height of said sample t and scanning said x-y stage 2 in an in-plane direction.

Said cantilever 3 is composed of substances such as Si, $Si_3N_4$, W, Pt and PtIr, and the distal end of the probe 3a is shaped with a small radius of curvature. Other types of probes are also employed, with a distal end being modified with chemical functional groups such as hydroxyl and carboxyl groups in composition, carbon nanotube, being coated with a metal, metal oxide, metal carbide, or decorated with diamond. The displacement of said cantilever 3 can be detected by optical lever system and optical interferometric system. In the optical lever system as shown in FIG. 5, a deflection position of reflected light caused by the displacement of said cantilever 3 is detected by a photodetector having four side-by-side photodiodes. The optical interferometric system offers the interference between a light reflected on back surface of said cantilever 3 and a light transmitted through a polarizing prism 9 to detect the deflection of said cantilever 3 as shown in FIG. 6. Furthermore, as shown in FIG. 7, the deflection can be detected directly by self-detection type cantilever such as a PZT thin film cantilever 3.

Said laser beam irradiator 5 is a semiconductor diode laser, but may be a light irradiator including a normal semiconductor photodiode. In addition, frequency modulation detection system of said cantilever 3 may be of either FM or AM. In the aforementioned embodiment, said cantilever 3 on said x-y stage 2 is supported on said z stage 4, but said x-y stage 2 may be designed to be movably placed in x-y-z directions having both of said two-dimensional scanning means and said vertical moving means, and said stage 4 may merely vibrationally support said cantilever 3. Said quantum beam irradiating means 7 may be mounted to the quantum beam aided atomic force microscope 1 or be placed in a separate system so as to conduct quantum beams onto the sample surface.

Next, the operation of the aforementioned quantum beam aided atomic force microscope 1 and quantum beam aided atomic force microscopy using the same will be described.

The quantum beam aided atomic force microscope 1 of this embodiment irradiates a surface of a sample t with quantum beams having resonance energy that interacts with element to be detected, using said quantum beams irradiating means 7. Subsequently, said position sensitive detector 6 detects the change in interaction force such as attractive and repulsive forces found between an atom of the surface of the sample t irradiated with quantum beams having resonance energy and the distal end of the probe 3a, and said control apparatus 8 outputs atomic force microscope images in an image output device. However, if the cantilever 3 is a PZT thin film cantilever as shown in the FIG. 7, the use of the position sensitive detector 6 is not required.

For example, the surface of the sample t is irradiated with a specific quantum beam, e.g., X-ray, having a given core electron transition energy to be excited to the outermost shell characteristic of element to be detected, and a comparison of atomic force microscope images is made under irradiation with X-ray and no irradiation. By this comparison, elements distributed on the surface of the sample t to be detected can be identified.

Also, by fixing the distal end of the probe 3a of the cantilever 3 to a specific area of the surface of the sample t and detecting the change in interaction force between the atom of the surface of the sample t and the distal end of the probe 3a with a sequential change in the energy of irradiated X-ray, types of atoms in the area can be identified.

Additionally, using the difference in electron transition energy, it is possible to identify chemical state for atoms of the surface of the sample t, even in the same element. First, using different core electron transition energy excited to the outermost shell in the same element, energy position with the change in interaction force between the surface of the sample t and the distal end of the probe 3a can accurately be detected. Then, a comparison between the energy position obtained and the distribution of core electron transition energy to be excited to the outermost shell in each chemical state of the relevant element leads to the analysis of chemical state of the corresponding surface of the sample t.

From the above observations of this embodiment, the use of the quantum beam aided atomic force microscope 1 can simultaneously achieve atomic-level configuration observation and elemental analysis, and the chemical state of the surface of the sample t can be performed. Also, this invention can be applied to the following fields.

(a) Application to the Development of Catalyst Materials

To develop and improve catalyst materials having higher catalytic reaction activity and catalytic response selectivity, the design and construction of nano- and atomic-level high-precision catalytic surface are required, and material analysis and research are also essential with the same accuracy.

Using this invention, the sample surface of catalysts, such as a metal oxide, nitride and carbide, characterized by significantly dispersed and supported metallic and metal oxide active components, is analyzed in a catalytic reaction atmosphere or in a vacuum. In this analysis, physical and chemical state for nano- and atomic-level catalyst components, reacting molecules, reaction intermediates and reaction product molecules can be identified, as well as their structure, position and distribution.

(b) Application to the Development of Semiconductor Devices and Sensors

In fact, providing methods for preparing high-density integrated circuits with high-speed and stable operation is vital to the development of semiconductor devices and sensors. Recent technological progress is expected to achieve atomic and molecular devices, using quantum dot, organic molecules and biomolecular thin films. This invention can realize nano- and atomic-level elemental analysis and chemical state analysis that conventional device evaluation approaches cannot accomplish in air environment in which semiconductor devices and sensors are operated, in a vacuum or in solution.

(c) Application to the Medical Field

It has been conventionally known that biopolymers such as enzymes, proteins and DNA include metal ions and atoms having various functions in composition. Conventional approaches require the identification of the atom position in these metal ions and the analysis of their chemical action by means of various chemical analysis methods like X-ray diffraction. Nevertheless, the use of this invention will identify metallic ions and atom position in a biomolecule e.g. by preparing and observing a substrate that can absorb and hold the biomolecule in solution. Their chemical action can be found by mixing acting molecules with the solution and immediately observing the behavior.

The quantum beam aided atomic force microscopy and quantum beam aided atomic force microscope of this invention is not intended as a definition of the limits of the above described embodiment, but may be modified accordingly.

For example, X-ray is a type of quantum beams, with which the sample can be irradiated even in solution, with its electron transition energy characteristic of element being identified, indicating a favorable quantum beam in this embodiment. But, other quantum beams such as laser beam, electrons and charged particles, that contain energy for changing interaction force between the distal end of the probe 3a and the sample surface, may be employed.

BRIEF DESCRIPTION OF THE DRAWINGS

The above and other objects of the invention will be seen by reference to the description taken in connection with the accompanying drawings, in which.

EXPLANATION OF LETTERS AND NUMERALS

Figure 1:
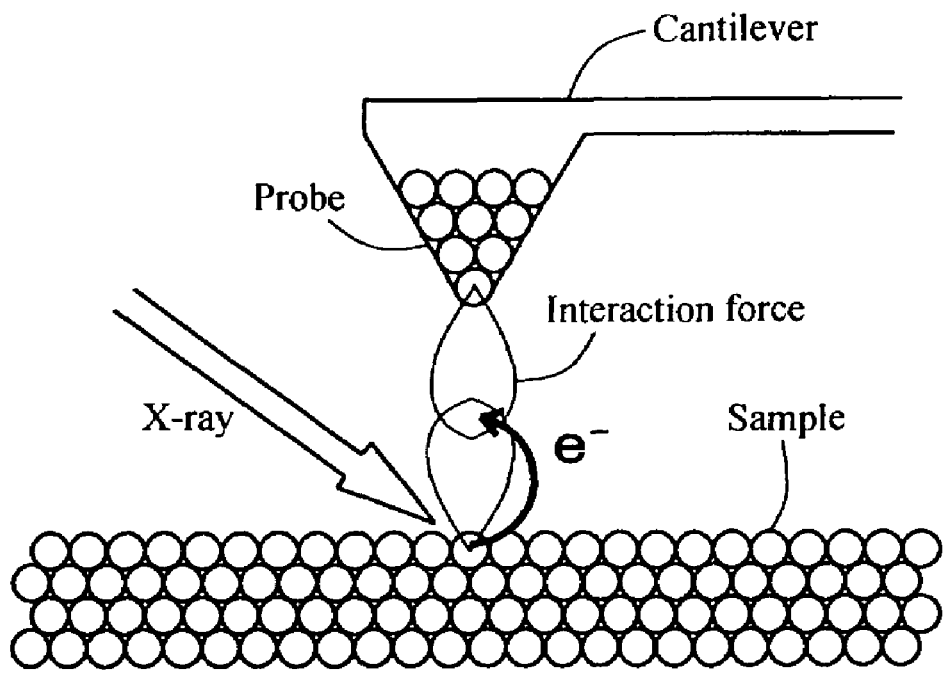
FIG. 1 is a pattern diagram illustrating the basic principle of the quantum beam aided atomic force microscopy and quantum beam aided atomic force microscope according to the present invention.
Figure 2:
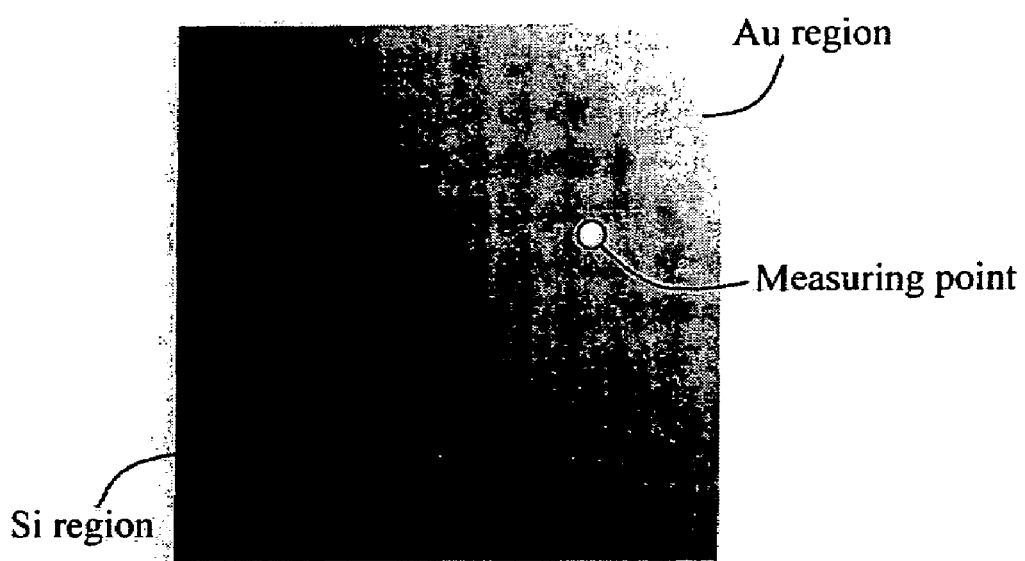
FIG. 2 is a microscope image showing the non-contact atomic force microscope image of Au/Si sample used in the demonstration experiment for verifying the basic principle of this invention.
Figure 3:
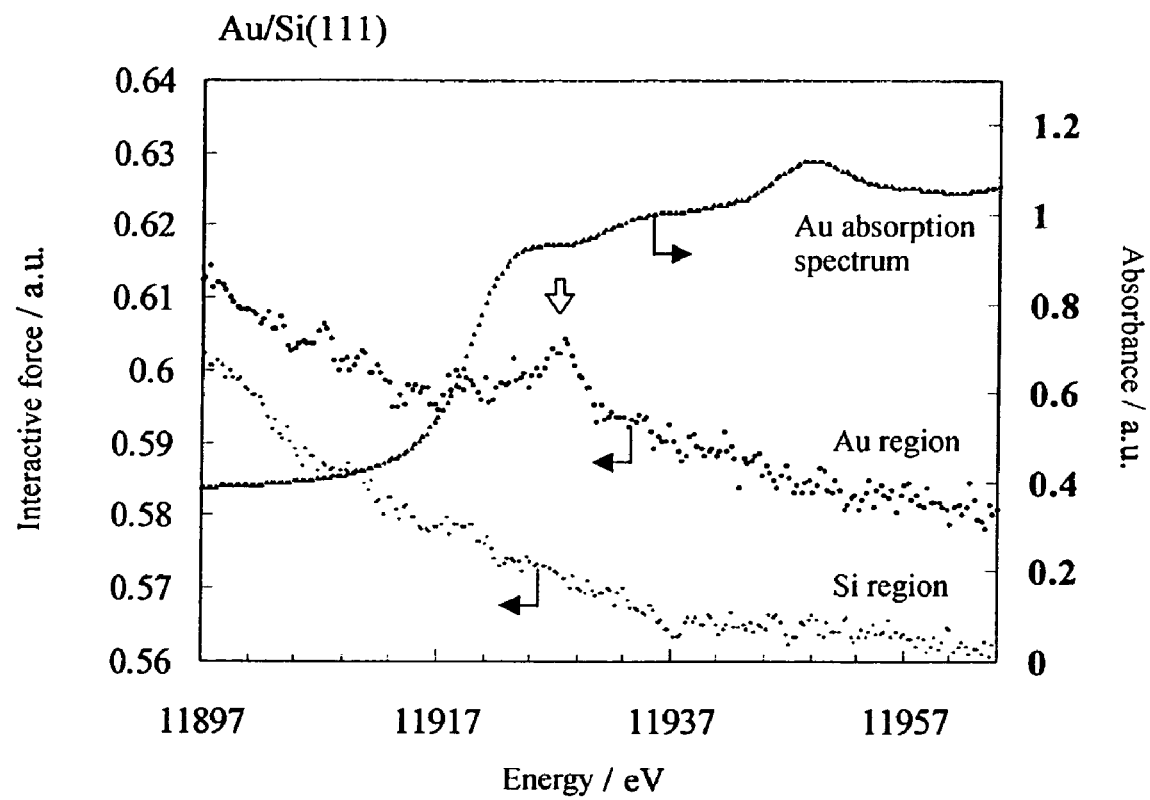
FIG. 3 is a graph showing the results of the demonstration experiment for verifying the basic principle of this invention, with X-ray irradiation energy on the horizontal axis, interaction force on the left vertical axis and X-ray absorbance in Au on the right vertical axis.
Figure 4:
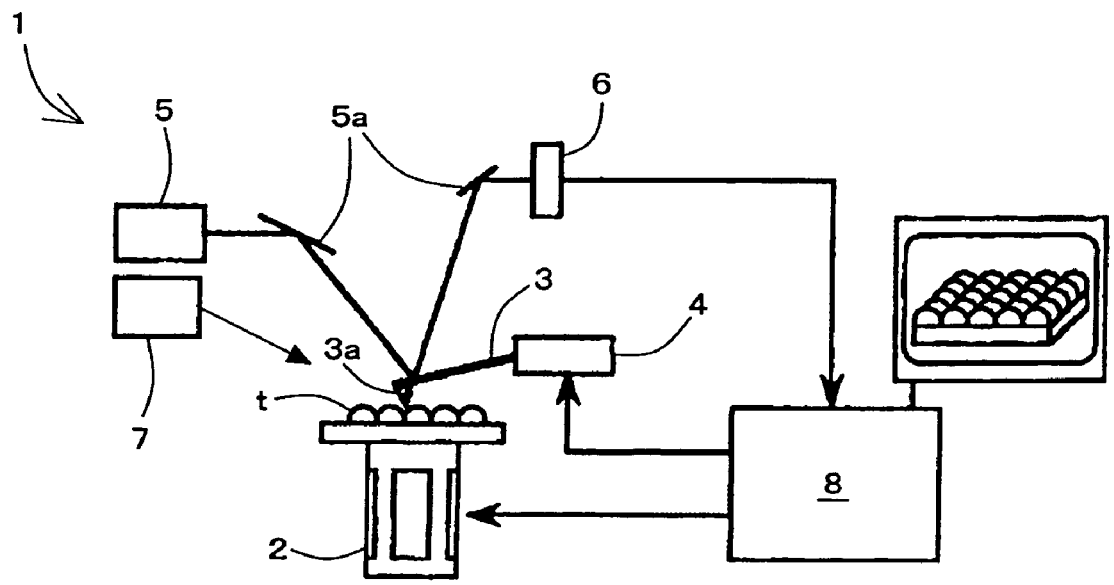
FIG. 4 is a pattern diagram showing the configuration of the quantum beam aided atomic force microscope of this embodiment.
Figure 5:
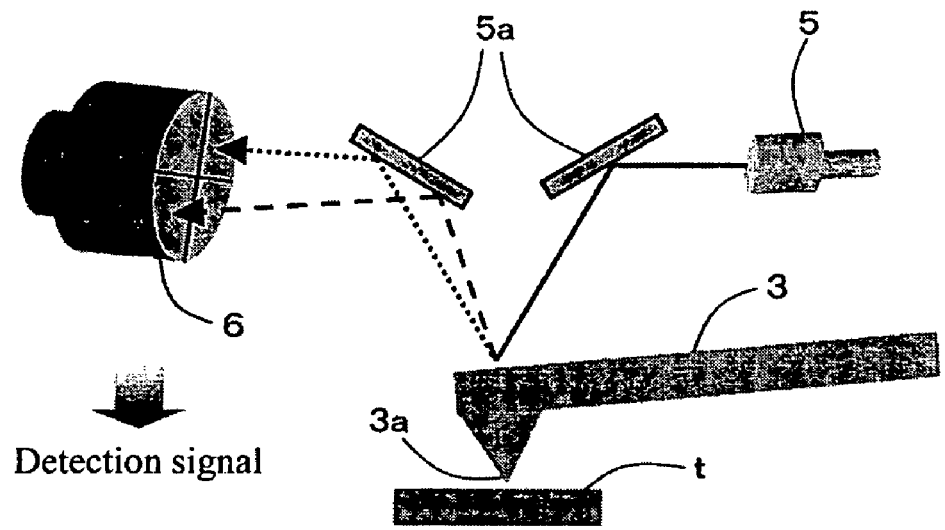
FIG. 5 is a pattern diagram showing the optical lever system for detecting the displacement of the probe of this embodiment.
Figure 6:
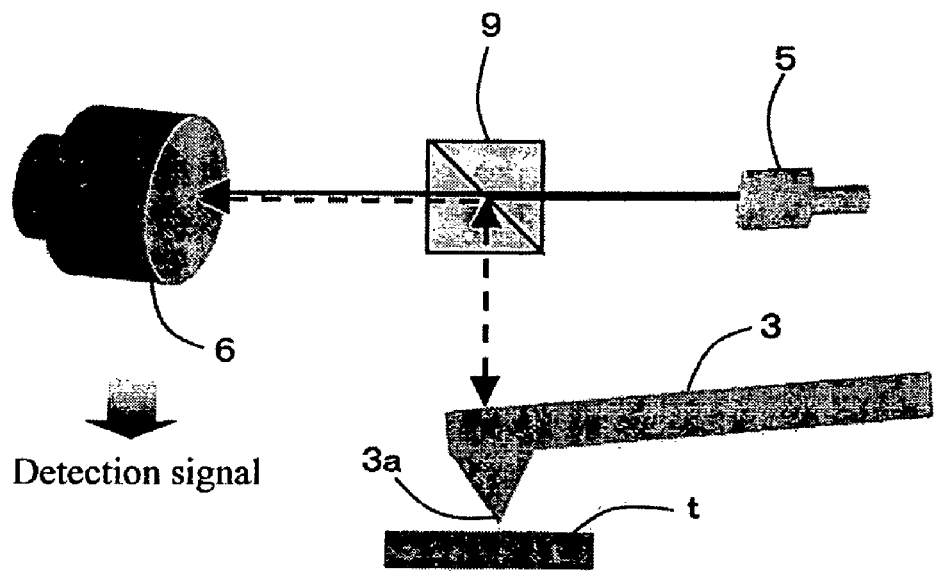
FIG. 6 is a pattern diagram showing the optical interferometric system for detecting the displacement of the probe of this embodiment.
Figure 7:
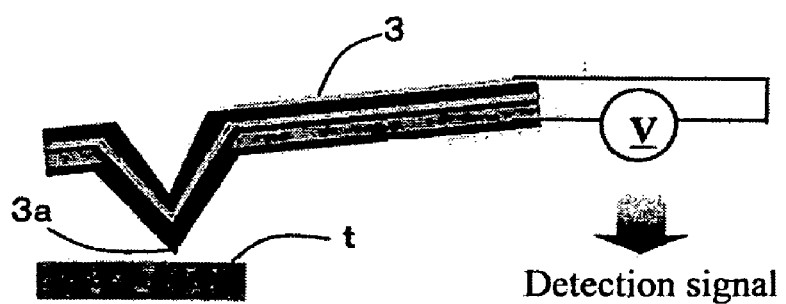
FIG. 7 is a pattern diagram showing the self-detection type cantilever system that employs a PZT thin film cantilever for detecting the displacement of the probe of this embodiment.

1: quantum beam aided atomic force microscope
2: x-y stage
3: cantilever
3a: probe
4: z stage
5: laser beam irradiator
5a: reflecting mirror
6: position sensitive detector
7: quantum beams irradiating means
8: control apparatus
9: polarizing prism
t: sample

The invention claimed is:

1. A quantum beam aided atomic force microscopy, comprising the steps of:
    irradiating atoms of a sample surface with quantum beams such as photons, electrons and charged particles having a given electron transition energy characteristic of element; and
    detecting the change in interaction force between each of said atoms of said sample surface irradiated with said quantum beams and a distal end of a probe.

2. A quantum beam aided atomic force microscopy, comprising the steps of:
    irradiating atoms of a sample surface with given quantum beams such as photons, electrons and charged particles; and
    detecting the change in interaction force between each of said atoms of said sample surface and a distal end of a probe by sequentially changing the energy of said given quantum beams.

3. A quantum beam aided atomic force microscopy, the atomic force microscopy comprising the steps of:
    relatively scanning a probe over a sample surface;
    detecting the interaction force between a distal end of said probe and each of atoms of said sample surface; and
    analyzing the state of said sample surface,
    wherein:
    atomic force microscope images are obtained without irradiating said sample surface with quantum beams, and atomic force microscope images are obtained under irradiation with quantum beams by irradiating said same sample surface with quantum beams such as photons, electrons and charged particles by fixing a given electron transition energy characteristic of element thereof.

4. The quantum beam aided atomic force microscopy, set forth in any one of claims 1 through 3, wherein:
    quantum beams, with which atoms of a sample surface are irradiated, are X-ray having core electron transition energy to be excited to the outermost shell characteristic of element to be detected.

5. A quantum beam aided atomic force microscope, the atomic force microscope comprising:
    a cantilever having a sharp probe that interacts with atoms of a sample surface;
    a displacement sensor for detecting the deflection of said cantilever;
    a two-dimensional scanning means for relatively scanning said probe over said sample surface two-dimensionally in a horizontal direction thereof; and
    a vertical moving means for relatively controlling the distance between said probe and said sample surface in a vertical direction,
    wherein:
    a quantum beams irradiating means is included for irradiating atoms of said sample surface with quantum beams such as photons, electrons and charged particles having a given electron transition energy characteristic of element, and
    said displacement sensor detects the change in interaction force between each of said atoms of said sample surface irradiated by said quantum beam irradiating means and a distal end of said probe.

6. The quantum beam aided atomic force microscope, set forth in claim 5, wherein:

said displacement sensor detects the change in interaction force between said distal end of said probe and each of said atoms of said sample surface by sequentially changing the energy of quantum beams with which each of said atoms of said sample surface is irradiated by said quantum beam irradiating means.

7. The quantum beam aided atomic force microscope, set forth in claim 5, wherein:

atomic force microscope images are outputted by relatively scanning said probe over said sample surface by said two-dimensional scanning means without irradiating said sample surface with quantum beams, and atomic force microscope images are outputted under irradiation with quantum beams by irradiating said same sample surface with quantum beams such as photons, electrons and charged particles by fixing a given electron transition energy characteristic of element thereof.

8. The quantum beam aided atomic force microscope, set forth in any one of claims 5 through 7, wherein quantum beams, with which atoms of a sample surface are irradiated, are X-ray having core electron transition energy to be excited to the outermost shell characteristic of element to be detected.

\* \* \* \* \*